United States Patent [19]

Swearingen

[11] 4,074,946
[45] Feb. 21, 1978

[54] SHAFT-ROTOR COUPLING

[76] Inventor: Judson S. Swearingen, 2235 Carmelina Ave., Los Angeles, Calif. 90064

[21] Appl. No.: 709,382

[22] Filed: July 28, 1976

[51] Int. Cl.² ............................................. B25G 3/02
[52] U.S. Cl. .................................. 403/364; 403/337; 192/67 R; 403/28
[58] Field of Search ............... 403/364, 332, 333, 334, 403/360, 361, 15, 28, 29, 30, 337, 258; 415/136, 138; 192/67 R

[56] References Cited

U.S. PATENT DOCUMENTS

| 776,391 | 11/1904 | Giese | 403/364 X |
|---|---|---|---|
| 2,710,763 | 6/1955 | Gilbert | 403/364 |
| 2,728,895 | 12/1955 | Quackenbush et al. | 403/364 X |
| 2,836,448 | 5/1958 | King | 403/258 |
| 3,478,542 | 11/1969 | Dinger et al. | 403/258 X |
| 3,500,660 | 3/1970 | Anderson | 403/337 X |
| 3,601,501 | 8/1971 | Johnson et al. | 403/258 X |

Primary Examiner—Wayne L. Shedd
Attorney, Agent, or Firm—Browning, Bushman & Zamecki

[57] ABSTRACT

A coupling for two members such as a shaft and a compressor rotor or a turbine rotor carried thereby in which it is necessary that the rotor be firmly and tightly fixed with respect to the shaft at all times and in which the rotor and shaft may be subjected to widely different temperatures at any one time. On one of the members, usually the rotor, there are provided three fingers or projections extending toward the other member, while the other member is provided with recesses to receive and fit such projections. The projections are wedge shaped with side plane surfaces parallel to a radius extending from the axis of rotation so that the portions of the members carrying the fingers and recesses can move radially simultaneously outwardly or inwardly relative to one another as one expands or contracts more than the other, without tightening or loosening the coupling. At the same time, the three fingers and recesses receiving them will accurately position the two members relative to one another both with regard to centering them on the same axis and with regard to keeping the axes of rotation of the two members in position so that they coincide.

11 Claims, 18 Drawing Figures

SHAFT-ROTOR COUPLING

BACKGROUND OF THE INVENTION

1. Field of the Invention

This invention relates to rotating machines, especially high-speed rotating machines, in which there is a rotating shaft with a rotor or other rotating member attached to it, and more especially in which the rotor is attached to the end of the shaft.

Most of the attachments for rotors or wheels on rotating shafts are by means of a hole through the center of the rotor with keys or other rotary driving means interconnecting them, and the rotor is held against a shaft shoulder by means of a screw or nut. In some instances, where it is objectionable to have a hole in the center of the rotor, the rotor is held on the shaft by a facing flange on the shaft with screws passing through holes in the marginal portions of the flange, usually threaded into the rotor.

In some other instances the rotor is attached by means of matching gear teeth called a curvic coupling, one member of the matched pair being on the wheel and the other on the shaft. Such a coupling is illustrated in FIG. 2 of the patent to Wildhaber, U.S. Pat. No. 2,429,284, issued Oct. 21, 1947.

Such an attachment of a rotor to a shaft, whatever its form, must have adequate driving strength and must maintain concentric and angular alignment between the rotor and shaft.

The application in which such rotor and shaft are used may subject the two to differing temperatures. Also, the rotor is more highly stressed at the center bore than in other portions of the rotor, and this plus the temperature difference changes the relative fit of the bore in the rotor about the shaft, and tends to leave the rotor free to move radially somewhat, thereby causing the assembly to become unbalanced.

The above mentioned high tangential stress at the bore of the rotor, because of Poisson's ratio effects, causes a corresponding axial shrinkage of the rotor adjacent the bore, so that the bolt or nut clamping the rotor on the shaft has a tendency to be loose during high speed rotation because of this shrinkage.

2. Description of Prior Art

These problems are normally solved or attempted to be solved by having as tight fit as possible of the rotor bore on the shaft and by having keys on the shaft or splines on the shaft. In the case of the flanged attachment mentioned above, the flange attachment is assumed to stretch reasonably uniformly in all radial directions and thereby to maintain reasonably good axial alignment. However, there is nothing to ensure such uniformity of radial stretch nor positive maintainence of alignment of the axes.

Sometimes the attachment in the bore of the wheel is made with a shrink fit with the hope that after the rotor stretches, it will not be excessively loose. Such a joint on a shrink fit, or a taper fit, is often difficult to disassemble.

These radial fits also have another problem if there is slight angular (rotational) looseness — they allow possible relative movement of the rotor on the shaft causing possible wear and fretting.

SUMMARY OF THE INVENTION

It is the object of this invention to overcome the problems above stated and secure the advantages now to be stated.

In my invention, I solve these problems by an attachment consisting of three peripherally spaced pairs of mating suppport elements on the shaft and/or flange and on the end surface of the rotor respectively, in combination with a securing means for holding said elements engaged. The securing means clamps the rotor onto the shaft with three special areas or elements of contact on the back of the rotor resting on mating contacts or elements on the shaft. Each of these contacts consists of a wedge, tooth or finger fitting into a mating groove or recess. Preferably each of the three grooves and the crests or apexes of each of the three wedges extends radially or with a substantial radial component. The sides of the wedge are preferably plane surfaces and symmetrical, and do not taper or curve radially as do the engaging surfaces of the curvic coupling. Thus each wedge or tooth is free to slide radially in its mating groove or recess as the part on which it is mounted expands or contracts radially, without binding or loosening in its groove or recess. The curvic coupling, because its engaging surfaces curve radially, does not permit such movement.

With the rotor clamped onto these three wedge-shaped supports, it is obvious that the supports will drive or be driven by the rotor. It is equally obvious that the rotor will be held against angular misalignment by the converging radial components of the mating support elements.

If there is any radial expansion of the rotor, each wedge is free to move radially outward in its groove, but the angular (rotational) position of each wedge relative to the shaft will remain unchanged and, therefore, the axial alignment of the rotor will not change.

It is equally obvious that there is no angular looseness in such a joint because each side of the wedge loads the opposite side, so that each of the three individual supports are tight in the tangential direction. It also is apparent that this simple support requires no force to part it; it is angularly tight; and it permits the rotor to freely expand or contract radially relative to the shaft without losing its axial alignment.

There are additional features and advantages, as follows:

The sides of a wedge can be at quite a wide angle to each other, such as 120° or so, and this allows wide areas on the wedge faces for carrying the axial load, even though there are only three contact areas. This is possible without excessive axial depth of the grooves.

The wedges can be integral with either shaft or rotor but preferably with the face of the rotor, thus virtually eliminating the concentrated stresses that might exist if there were grooves in the rotor. At the bases of the wedges, where they meet the face of the rotor, the angle or "notch" effect can be minimized by the wide wedge angle and by good fillet transitions.

If a hole in the center of the rotor is objectionable due to high stress, the attachment can be made by means of a flange and peripheral screws to clamp the three support element pairs firmly. These screws can be tapped into or otherwise attached to the rotor along a circumferential line outward from the axis where the stress may be lower. It is well known that metal under high stress corrodes more quickly and that once corroded is weakened and more highly stressed, inducing cracking.

With these features of low stress in the present invention, it provides a favorable attachment mechanism to avoid stress cracking problems due to chemical action.

The wedges or teeth and mating recesses may also be unequally spaced in a circumferential direction, so they will fit in only one angular relation.

The wedges (teeth) can be put on the back of the rotor, as just described, and the notches cut into the shaft. This favors low stress in the rotor. However, if there is a problem in providing adequate seal length on the shaft or other affected length requirements on the shaft, the teeth can be put on the shaft to fit into grooves in the rotor.

The angles on the teeth (wedges) can be any angle, although as mentioned above, a flat angle is preferable because it presents a wide support surface, and reduces the stresses due to the wedge action. It should exceed a sticking wedge angle.

If the projecting axial teeth are on the part that is expanding radially relative to the mating part, a single tooth will also expand tangentially, thus forcing some relative axial movement of the shaft and rotor, thus in part compensating for Poisson ratio shrinkage of the part carrying the teeth, the degree of compensation depending on the angle chosen for the flanks of the tooth.

The two sides of the tooth need not be in planes whose intersection line is perpencidular to the axis of the shaft. For example, they might lie in planes in which a radial line lies substantially at the center of each loaded tooth face. This likewise should produce no significant axial movement upon expansion of one mating part relative to the other.

This invention provides a further advantage that the rotational drive engagement is at the largest shaft diameter, rather than within a bore or the like, and thus involves lower unit driving stress on the torque transmitting elements.

Ease of manufacture: another important advantage of this coupling is the ease with which it can be manufactured on simple standard machine tools during which a high degree of precision can be maintained. For example, in cutting the teeth on the rotor, the rotor can be mounted and aligned on a rotary table and the rotary table mounted on an angle block, for example 30° angle block. The angle block in turn, may be mounted on the table of a milling machine. Then, if opposite faces of the fingers are to be at equal angles, with a flat-ended end milling cutter set in a selected position near the center of the rotor, the milling table can be manipulated without remounting or changing of tools to cut all the wedging surfaces.

By one remounting of the work, it is possible to make the opposite faces of the teeth at different angles, as might be desired if the drive through the coupling is to be always in one direction.

The material not removed by the above operation is then removed by conventional means, because it does not contact anyway, and therefore its accuracy is not critical.

In the removal of this material between the three teeth, it is desirable that such metal be removed with reasonably close accuracy to leave a predetermined small clearance from the surfaces between the grooves. Then the surfaces left between the teeth can serve as a support, bearing against the surfaces between the mating grooves, to limit rocking motion during assembly, and as a protection during possible mishaps, such as a loose screw in the attachment.

As to the teeth or slots on the shaft, they may be machined by a milling machine in the same manner.

Ease of Balancing: should the above machining of the rotor be slightly off of exact center, this would not hinder rotor balancing. The rotor would be located both on its shaft and on the balancing machine shaft by its teeth and by the recesses on its shaft or the machine shaft. The balancing machine shaft should have recesses identically positioned with reference to its axis as the recesses in the shaft end on which the rotor is to be used. This should be done with precision on both balancing machine and shaft. Therefore, the rotor should occupy the same position relative to the balancing machine shaft axis as to its own shaft axis. Then when the rotor is balanced on the balancing machine, it will likewise be balanced on its own shaft.

To balance such a rotor, if the teeth are equally spaced circumferentially, the rotor can be mounted on the arbor in a selected position, any of the three, and dynamically balanced. Then if the rotor is changed 120° and dynamic balancing repeated, and again mounted in the third position and dynamic balancing repeated, with records maintained, it is possible by a simple calculation to find where the imbalance on the arbor is and where the imbalance exists on the rotor. These corrections can then be made by metal removal or by the addition of weights, and the process repeated to improve the accuracy. After that, the arbor then approaches perfect dynamic balance, and the rotor also approaches perfect dynamic balance in any of its three possible positions, so that it is not important for the rotor to be mounted in a marked position.

Referring now to the drawings, there are illustrated certain preferred embodiments of the invention. It will be understood, however, that these are for purposes of illustration and example only and not by way of limitation.

DESCRIPTION OF THE PREFERRED EMBODIMENTS

Figure 1:
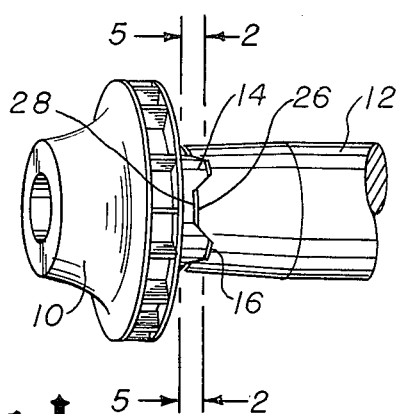
FIG. 1 is a view in perspective illustrating one preferred form of the invention and showing a shaft and rotor in coupled relation to one another.

Referring first to FIGS. 1-9 inclusive, there is shown a form of the invention in which a rotor 10 is mounted on a shaft 12 coupled thereto by coupling by means constructed in accordance with this invention. The rotor may be of a character employed as a part of a pump or compressor, as a rotor of a turbine, or any other rotor type device intended to be mounted on and carried in a rotary operation by a shaft.

In this instance there are shown on the rotor 10 projecting fingers, teeth or the like in the form of wedges 14, three in number, spaced circumferentially about the axis of the rotor and extending axially into engagement with recesses 16 in the end of the shaft 12 correspondingly spaced, sized and positioned to receive the respective wedges, fingers or teeth 14. These fingers are shown integral with the rotor but it will be understood that they may be secured to the rotor in any suitable rigid fashion instead of being made initially integral with it. Also, while three fingers are required for efficient operation, additional fingers would not be excluded.

Figure 4:
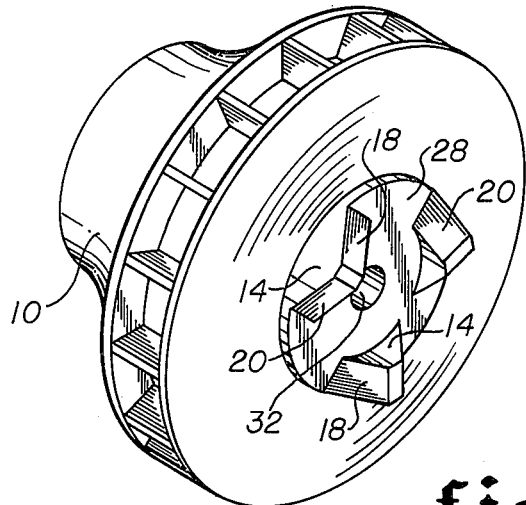
FIG. 4 is a perspective view of the rotor shown in FIGS. 2 and 3 illustrating in perspective the coupling elements carried by the rotor.
Figure 2:
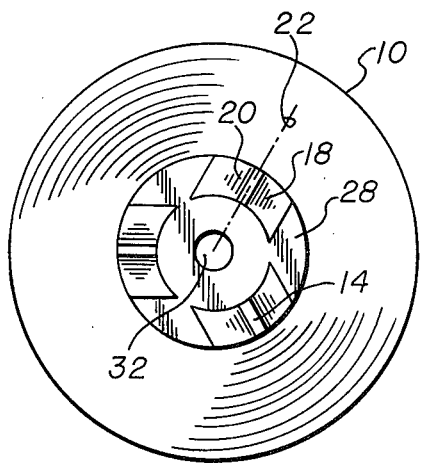
FIG. 2 is a view along the line 2—2 of FIG. 1 showing an end elevation of the rotor and illustrating those elements of the coupling which are carried by the rotor.
Figure 3:
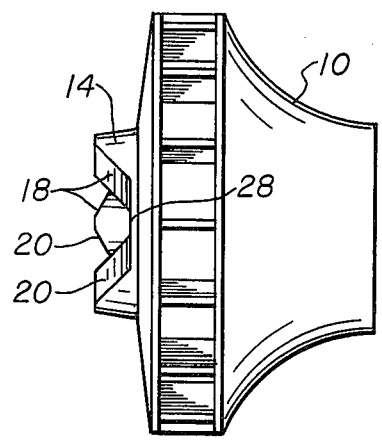
FIG. 3 is a side elevation of the rotor and the coupling elements carried thereby.

By reference to FIGS. 2 and 4, it will be seen that each of the fingers or teeth 14 has two inclined sides opposed to one another at 18 and 20 and that each of the fingers or teeth is a wedge directed axially with respect to the axis of rotation of the rotor. By reference to FIG. 2 it will be seen that each of the sloping or inclined surfaces 18 and 20 is a plane surface. On a single wedge of this form of the invention, the sloping surfaces of the wedge have their elements all parallel to a single radius. Thus, such a wedge could move radially outward or inward relative to a mating radial groove without moving axially relative thereto, and without becoming looser or tighter in the groove.

Figure 7:
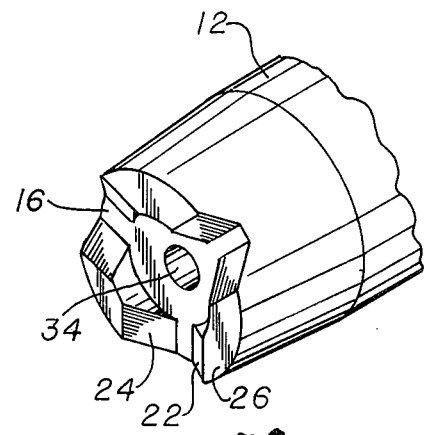
FIG. 7 is a perspective view of the end of the shaft shown in FIGS. 5 and 6 with the coupling elements thereon appearing in perspective.
Figure 5:
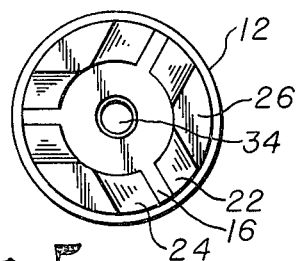
FIG. 5 is an end view of the shaft taken along the line 5—5 of FIG. 1 showing those coupling elements which are carried on the shaft.
Figure 6:
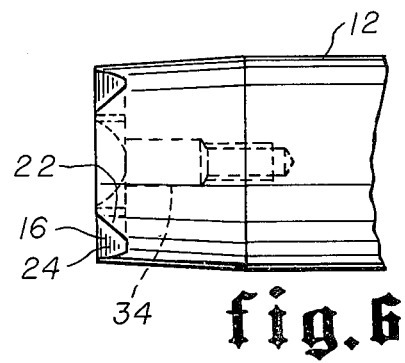
FIG. 6 is a side view of the shaft end illustrated in FIG. 5.

By reference to FIGS. 5-7, it will be seen that the grooves 16 on the shaft 12 into which the wedges 14 fit, are also formed with inclined side surfaces 22 and 24 corresponding to inclined surfaces 18 and 20 on the wedges.

Figure 8:
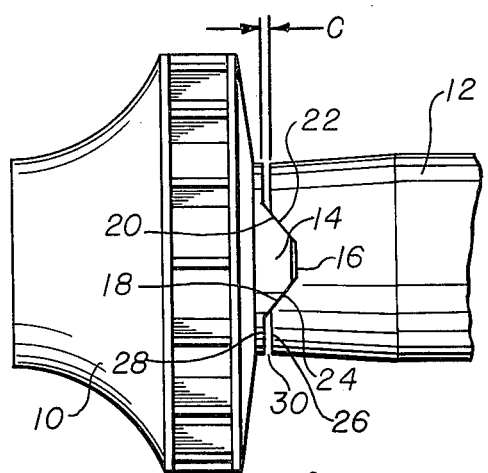
FIG. 8 is a side elevation of the rotor and shaft illustrated in the preceeding FIGS. and illustrating the narrowness of the clearance between opposed parts of the rotor and the shaft to prevent them from excessive misalignment during assembly.
Figure 9:
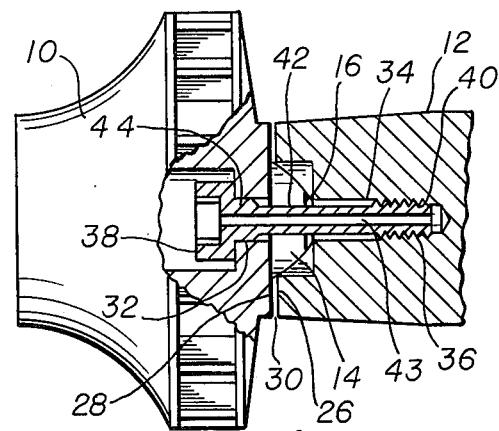
FIG. 9 is a view similar to FIG. 8 but with parts broken away and shown in cross-section to illustrate the manner of holding the rotor and shaft together.

Between the grooves 16 on the end of the shaft 12 there are flat radial surfaces 26, all of which are shown as being in a single plane. When assembled to the mating rotor, as illustrated in FIGS. 8 and 9, these surfaces 26 are substantially parallel to corresponding lands 28 between the fingers or wedges 14 on the rotor, and are spaced from such lands by a clearance 30. The surfaces forming the lands 26 and 28 do not have to be formed with great accuracy but only sufficiently accurately to ensure that there will be a small space such as in space 30 between them when the parts are assembled. The purpose of this space or clearance is to leave the relative positioning of the rotor 10 and the shaft 12 entirely to the inter-fitting of the wedges 14 and the grooves 16 when the parts are fully assembled, yet to provide surfaces which can abut should the means holding the rotor and shaft together become loose, and thus limit the angular movement of the rotor and shaft axes relative to one another in such event, and avoid possible damage resulting therefrom.

In the form illustrated in FIGS. 1-9, the rotor 10 is provided with a central bore 32, coaxial with the rotor, and the end of the shaft 12 is provided with a corresponding concentric bore 34, terminating at its inner end in an internally threaded portion 36. A screw or stud 38 is shown extending from within the rotor 10 through the rotor bore 32 and into the shaft bore 34 and having a threaded end 40 engaging the threads 36 in the bore 34. Tightening the screw 38 to the position shown in FIG. 9 serves to secure together in rigidly coupled relationship to one another the rotor 10 and the shaft 12.

Preferably, in order not to interfere with the function of the wedges 14 and grooves 16 as the aligning portions of the coupling, the intermediate portion 42 of the screw 38 is reduced in exterior diameter so that it does not engage the interior surface of the bores 32 and 34. Only a portion adjacent the head of the screw 38 as shown at 44 is large enough to closely engage within the bore 32 to align the end of the screw 38 therewith, the opposite end of the screw being aligned with the bore 34 by means of the threaded inter-engagement of the end of the screw with the tapped portion 36 of the bore 34. This reduction of the exterior size of the screw 38 also serves to reduce its weight, which is desirable, and additional weight reduction may be accomplished by removing metal from the interior of the screw 38 to form an axial bore 43 through the screw. Metal may be removed in these ways so as to leave only that which is sufficient to hold the coupled members 10 and 12 together sufficiently to enable the coupling to transmit the necessary torque and sustain the other stresses to which it is subjected, without becoming loose.

Figure 10:
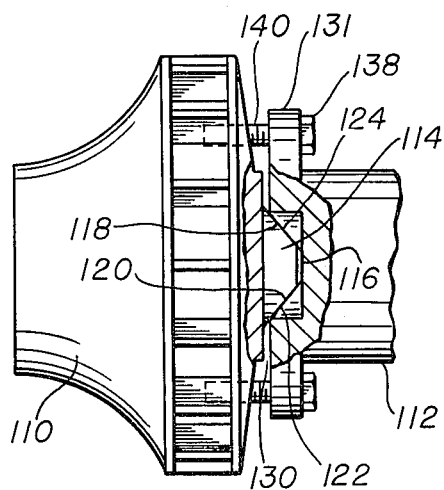
FIG. 10 is a view similar to FIG. 8 but with parts broken away and shown in cross-section and illustrating a modified form of means for holding the coupling together.
Figure 11:
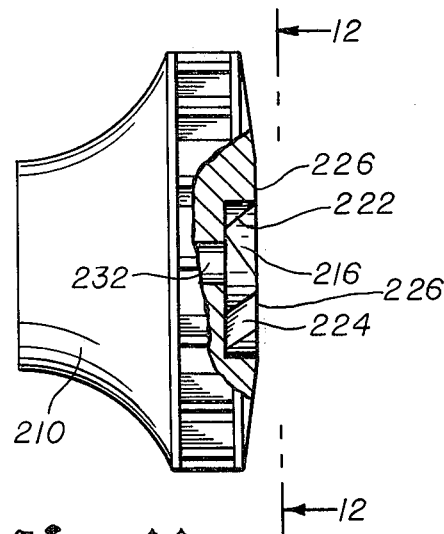
FIG. 11 is a side view of a rotor employing a still further modification of the coupling of this invention in which the rotor is provided with recesses adapted to receive wedge shaped tooth elements which wedge shaped elements are carried on the shaft instead of on the rotor, and in which the wedge shaped elements are also of modified form.
Figure 12:
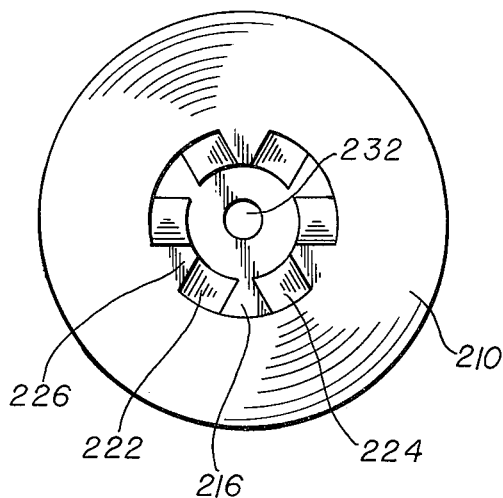
FIG. 12 is an end view of the rotor shown in FIG. 11 taken along the line 12—12 of FIG. 11.
Figure 13:
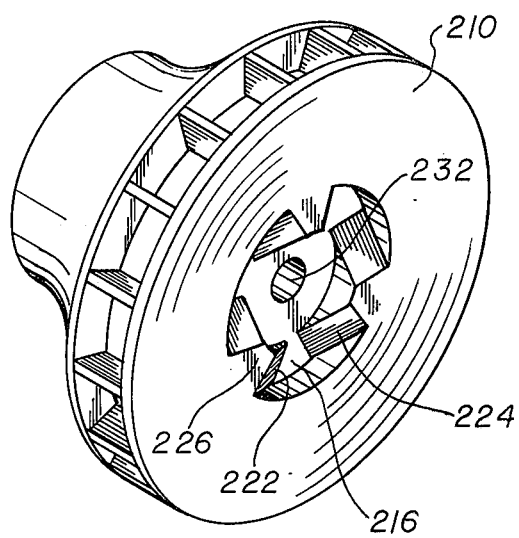
FIG. 13 is a perspective view of the rotor shown in FIGS. 11 and 12 illustrating in the rotor the recess elements for receiving the wedge shaped teeth that are carried on the shaft.
Figure 14:
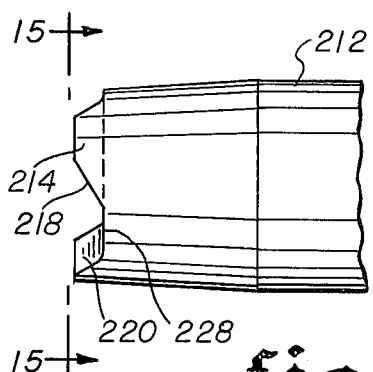
FIG. 14 is a side elevation of the end portion of the shaft having the coupling elements in the form of wedge shaped projections, teeth or fingers adapted to engage the coupling element recesses formed in the rotor of FIGS. 11-13.
Figure 15:
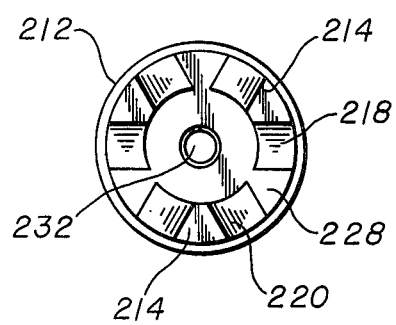
FIG. 15 is an end view of the shaft shown in FIG. 14 taken along the line 15—15 of FIG. 14.
Figure 16:
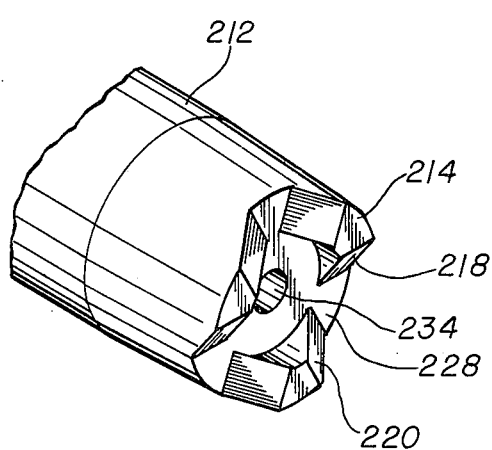
FIG. 16 is a perspective view of the end of the shaft illustrated in FIGS. 14 and 15.

In FIG. 10 there is illustrated a coupling which is substantially the same as that shown in FIGS. 1-9 except that, instead of employing the screw or bolt 38 for holding the coupling together, it employs flanges.

Thus, the rotor 110 of FIG. 10 is coupled by this modification of coupling to the shaft 112 through the medium of wedges 114 on the rotor inter-engaging with grooves 116 on the shaft, the same as in the previously described form. As in the previously described form, the wedges have inclined surfaces 118 and 120 oppositely inclined thereon relative to one another and having their elements parallel to radial elements. FIG. 10, being partly in section, the single wedge 114 which is illustrated in profile in this figure, is the one on the opposite side of the coupling and it is viewed in FIG. 10.

Likewise, the grooves 116 have inclined surfaces 122 and 124 which receive the inclined surfaces 118 and 120 respectively of the wedges 114. As in the previous form, these wedges and grooves are so sized and positioned as to space from one another the adjacent surfaces of the rotor 110 and shaft 112, which lie between the wedges on the rotor and the grooves on the shaft, as illustrated as 130.

In this form, a flange 131 is provided on the shaft 112 in a position which, when the coupling is assembled, will be spaced substantially away from the adjacent face of the rotor 110. This flange 131 will have bolt holes formed therein for the reception of bolts 138 having threaded portions 140 for threaded engagement with tapped openings in the adjacent portion of the rotor 110.

It will be seen that the coupling shown in FIG. 10 will thus be almost the same as that shown in FIGS. 1-9 except for the ommission of the axial bores 32 and 34 in the rotor and shaft, respectively, and the screw 38 extending therethrough. For certain purposes the form shown in FIG. 10 is preferable.

In FIGS. 11-16 a still further modification of the invention is illustrated. In this form, the recesses are formed within the contour of the rotor as may be desirable in certain instances in which space requirements may be an important factor. Here the fingers or wedges are formed on the shaft end, and actually project into or within the regular contour of the rotor.

Also, in this form, the inclined surfaces of the fingers and recesses are modified.

This form is similar to that described in connection with FIGS. 1-9 inclusive in that the shaft 212 has wedge-like projections 214 interfitting with wedge-shaped recesses 216 on the rotor 210, and in that projections 214 have inclined plane side surfaces 218 and 220 while the recesses 216 have inclined side surfaces 222 and 224 forming counterparts of the inclined surfaces 218 and 220 so as to receive those surfaces and accurately locate and align the rotor 210 and the shaft 212 relative to one another when they are brought together into inter-fitting relation. Likewise, the spaces between the projections 214 on the shaft 212 form plain surfaces 228 which are radial and preferably all in one plane, and these surfaces are so sized and spaced with regard to the other parts that when the parts of the coupling are assembled to one another there will be a clearance between the outer ends of the fingers 214 and the bottoms of the recess 216, and likewise a clearance between each of the spaces 228 between the projections 214, and the surface 226 of the rotor between the recesses 216. These spaces form clearances similar in form and purpose to the clearance 30 and to the clearance 130 shown in FIGS. 9 and 10 respectively.

Noteworthy of the form shown in FIGS. 11-16 inclusive are two facts. The first is that all portions of the coupling elements on the rotor are recessed within the regular outer contour of the rotor, as will be most apparent in FIGS. 11 and 13. This means that the rotor has no projecting parts for which clearance must be allowed within the housing in which it operates. Its end on which the coupling is formed may lie close to the adjacent housing wall so as to accommodate any design purpose for which such relationship is necessary. When the coupling is assembled, the projections 214 on the shaft will thus project into the recesses 216 and lie within the actual outer contour of the rotor 210.

Significant also is the fact that on each of the projections 214, and in each of the recesses 216, the respective inclined surfaces 218 and 220 on the projections and 222 and 224 in the recesses are not formed so that the elements on each pair of inclined surfaces are parallel to the same radius. Instead, each inclined surface has all of its elements parallel to one radius which extends outwardly from the axis substantially through the midpoint of the inclined surface, and the two inclined surfaces which make up a projection 214 are not only at angles to the axis of the shaft, but at angles to one another so that the elements of the two are not parallel.

In order to explain the reason behind the arrangement just described, it is to be understood that, underlying this invention is the concept that if a portion of each coupling element is considered as a unit which moves radially outwardly relative to the other unit when the first unit is increased in temperature more than the second, and inter-fitting parts on the coupled members, one of which is such a unit, are so shaped that one part may move outwardly relative to the other without tightening against or loosening from the other, the object of the invention would be achieved.

In the form described in FIGS. 1-9 inclusive, the unit considered as moving radially outwardly relative to the facing unit is a single wedge or finger. Circumferential or tangential expansion of such a unit under heat is not regarded as great enough to cause undesirable tightening or loosening of the wedging engagement. Hence, the fitting of such wedge shaped unit into its recess is accomplished with surfaces which have parallel radially extending elements so that these two units may move radially outwardly or inwardly without axial movement and without binding or loosening.

On the other hand, if, due to dimensions involved, or due to extreme differences in temperature encountered or stresses which cause greater than tolerable tangential or circumferential expansion or contraction, it becomes inpractical to consider a complete wedge including both of its inclined surfaces, as a unit that moves radially inwardly and outwardly, a different unit with less angular or circumferential extent must be adopted. In the case of the form of the invention shown in FIGS. 11-16 the unit adopted is a single inclined surface of which two such surfaces form each wedge and two such surfaces form each recess. Thus, the two engaging inclined surfaces are both provided with a shape having radial elements all of which are parallel to one another, but are not parallel to those of the next adjacent inclined surfaces. Thus, in this form, each inclined surface is regarded as a unit which moves radially inwardly and outwardly relative to the single inclined surface which it engages. The next pair of inclined surfaces is considered to move radially inwardly and outwardly, but since, as it becomes hotter, these two units move circumferentially further away from one another also, they move inwardly outwardly along two different radii. For convenience and optimum design such a radius in each case is taken as the radius which would extend outwardly substantially midway of the inclined surface.

Thus this last described form permits each inclined surface to move radially inwardly and outwardly in its own radial direction which is different from the radial direction along which each other incline surface on the same member moves inwardly and outwardly.

It is noteworthy that while each unit, considered as moving as a unit radially inwardly and outwardly relative to its mating surface, does also have some circumferential expansion, which, without any axial movement of the two parts would tend to produce tightness or looseness, this effect is somewhat offset by the Poisson effect which produces an axial shortening of a circular element as it expands radially.

By this invention, the problems heretofore described involving loosening, tightening, sticking, etc., of previous attempts to make tight joints by taper fits, shrink fits, and the like, and the effect of changes in temperature of one element of a coupled shaft and rotor compared with the other are minimized to a completely tolerable extent.

Moreover, the invention herein before set forth lends itself to a method of manufacture of the forms of coupling described so as to produce a very accurately formed structure which will produce excellent alignment of the two coupled parts with a very simple type of machining operation.

Figure 17:
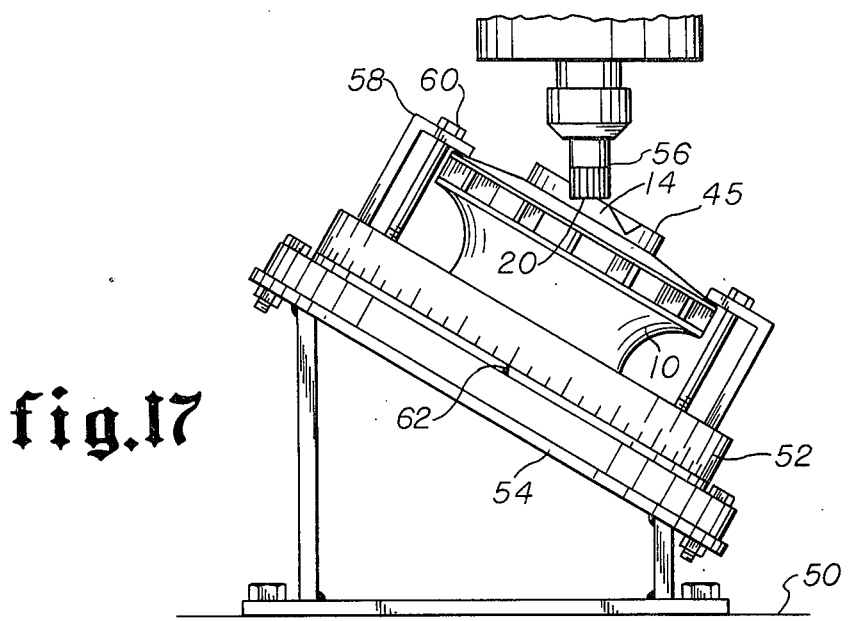
FIG. 17 is a diagrammatic illustration of the manner of mounting a rotor on an ordinary milling machine for the purpose of machining thereon the elements of the coupling as illustrated in the FIGS. 1-4 inclusive.
Figure 18:
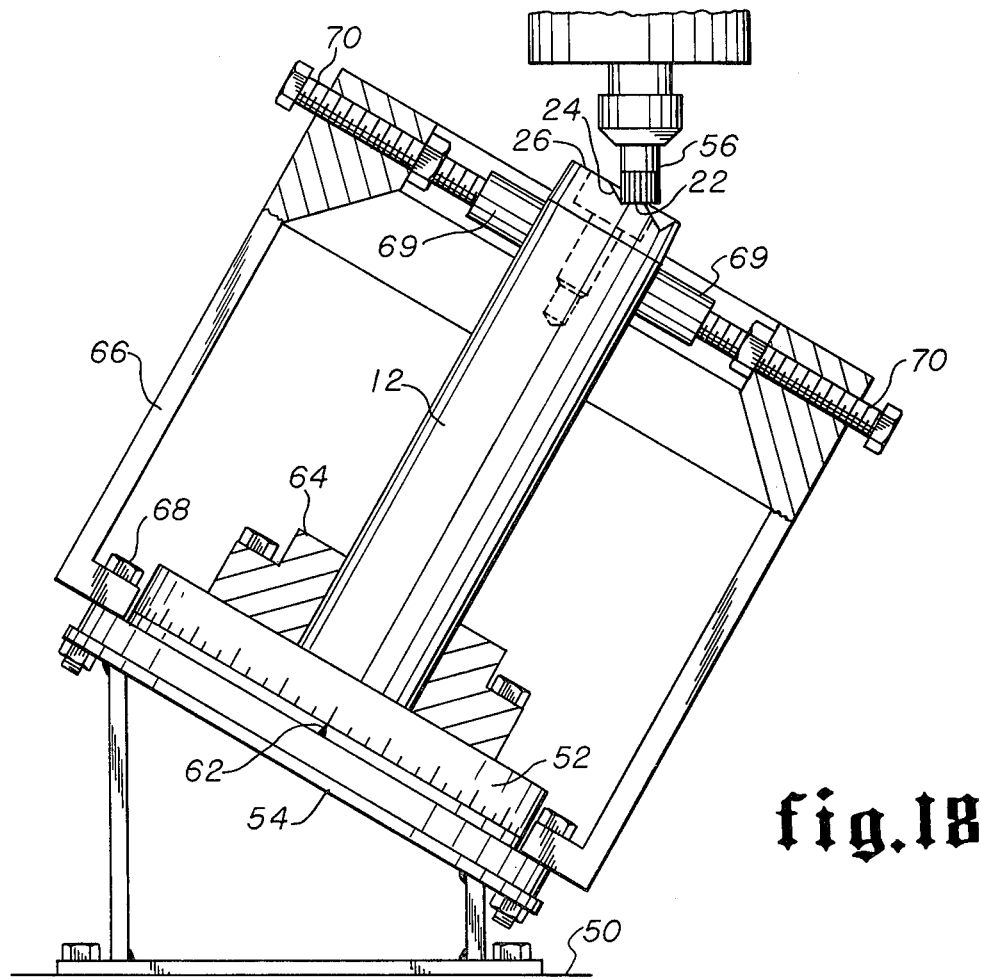
FIG. 18 is a view similar to FIG. 17 but illustrating the mounting on a milling machine of a shaft for the purpose of machining on the end thereof the coupling elements illustrated in FIG. 5-7 inclusive.

Referring to FIG. 17, there is illustrated a method of machining the projections or fingers 14 on the rotor 10 of the form of coupling illustrated in FIGS. 1-9 inclusive. In this illustration, the work is mounted on a mill table 50 of an ordinary milling machine. Secured to this table in conventional fashion, is a rotary indexing table 52 which is in turn mounted on an angle block 54 carried on the table 50. Thus the indexing table is supported on a predetermined angle on the mill table and the indexing table 52 may be rotated about its own axis to rotate the work in the form of the rotor 10 mounted thereon. A flat end milling tool 56 is mounted on the spindle of the milling machine. The angle selected for the angle block 54 is made equal to that of the inclination of one of the surfaces 18 or 20 of the wedge shaped finger or projection 14. The work piece 10 is clamped in place by conventional clamping means 58, and can be tightened by a nut 60 or the like.

It will be seen that with the work piece so mounted and the milling tool and work piece moved transversely of and at right angles to the axis of the milling tool, the end surface of the milling tool will machine the surface 20. Merely by indexing the rotary indexing table in steps of 120°, all of the surfaces 20 may be thus formed. Then by moving the milling tool transversely to the opposite side of the work piece the inclined surfaces 18 may be milled. Thus is provided a very accurate method of forming with minimum tolerances the critical surfaces 18 and 20.

The material between the surfaces 18 and 20 may be removed by other suitable well known tools, but because of the lack of criticality the accuracy required in forming surfaces 18 and 20 need not be achieved.

Similarly, this invention lends itself to forming of the inclined surfaces on the end of the shaft 12. In this case, as before, there is mounted on the mill table 50 a rotary indexing table 52, which in turn is carried on the inclined angle block 54, preformed to the desired angle for the surfaces 22 and 24. In this case the shaft 12 is carried in a chuck 64 mounted on the indexing table 52 so that it may be rotated as was the rotor in the previously described setup. In order to steady the end of the shaft 12 during the milling operation, a steady rest is provided in the form of a frame 66 carried on the angle block 54 and suitably secured thereon by bolts or the like 68. The upper end of this support, which is in surrounding relation to the end of the shaft to be machined, is provided with desired number (3 or 4) lubricated adjustable supports for bearing against the shaft to support it but still permit it to be rotated when the indexing table 52 is rotated. These adjustable supports 69 are radially adjustable by means of adjusting screws 70, and once adjusted will support the end of the shaft being machined to keep it from moving sideways.

The process of machining the inclined surfaces on the shaft end is substantially the same as hereinbefore described in connection with the machining of inclined surfaces on the rotor, and need not be repeated.

It will be seen that by this invention the various objects and advantages hereinbefore set forth have been achieved and the problems presented by prior devices and methods for similar purposes have been overcome.

I claim:

1. A coupling for joining two rotary elements and aligning and maintaining their axes in accurate alignment with each other and the joint between elements tight under conditions under which one element expands or contracts relative to the other, said coupling comprising a plurality of axially extending, circumferentially spaced teeth on one of said elements facing the other, three mating recesses on the other element positioned to receive said teeth, and means for securing said elements tightly together with said teeth firmly seated in said recesses, said teeth being in the form of wedges directed axially with plane tangentially exposed wedge zooming surfaces, each such wedge forming surfaces and each recess surface coacting therewith having its elements parallel to a single radial line perpendicular to said axis, and a pair of mutually adjacent plane surfaces on the same element being oppositely inclined relative to the axis.

2. A coupling as set forth in claim 1 in which the single radial line to which the elements of a plane surface are parallel, lies, at least in part, within said surface.

3. A coupling as set forth in claim 1 in which the elements of two of such plane surfaces which are circumferentially adjacent one another have their elements parallel to the same single radial line.

4. A coupling in accordance with claim 3 in which the single radial line to which the elements of two adjacent plane surfaces are parallel, lies, at least in part within one of said surfaces.

5. A coupling as set forth in claim 3 in which the single radial line to which the elements of two adjacent plane surfaces are parallel, is the line of intersection between said two surfaces.

6. A coupling as set forth in claim 5 in which the plane surfaces of each of the teeth intersect each other in an apex line and the said lines of such wedges are located in a single radial plane.

7. A coupling as set forth in claim 6 in which the apex lines of the wedges are all radial lines.

8. A coupling in accordance with claim 1 in which the plane surfaces are arranged in pairs of adjacent surfaces, and the elements of both surfaces in a single pair are parallel to the same radius and such surfaces of the same pair intersect the axis of rotation at equal angles.

9. A coupling in accordance with claim 1 in which the means securing said elements tightly together is tightened to the degree of being elastically distorted to such extent as to more than compensate for the Poisson effect axial shrinkage of the material as it expands radially under rotational stresses.

10. A coupling as set forth in claim 1 in which the means securing said elements tightly together is a bolt extending axially through one element and threaded into the other and has an opening axially thereof so as to eliminate metal not needed for torque transmission, and the exterior of said bolt is of reduced outer diameter to minimize the cross-section of the bolt which is subject to being stretched.

11. A coupling as set forth in claim 1 in which one of the two elements is a supporting shaft and the other is a rotor of a larger diameter than such shaft and supported thereby, and said teeth are on said rotor and said recesses in the end of such shaft.

* * * * *

UNITED STATES PATENT AND TRADEMARK OFFICE
CERTIFICATE OF CORRECTION

PATENT NO. : 4,074,946
DATED : February 21, 1978
INVENTOR(S) : Judson S. Swearingen It is certified that error appears in the above-identified patent and that said Letters Patent are hereby corrected as shown below:

Column 5, line 43, delete the word "by" second occurrence.

Column 10, line 38, delete the word "zooming", and insert therefor --forming--.

Signed and Sealed this

Fifteenth Day of August 1978

[SEAL]

Attest:

RUTH C. MASON
Attesting Officer

DONALD W. BANNER
Commissioner of Patents and Trademarks